United States Patent [19]

Suda et al.

[11] Patent Number: 4,862,286

[45] Date of Patent: Aug. 29, 1989

[54] IMAGE READING APPARATUS WHICH ADJUSTS IMAGE SIGNALS TO IMPROVE SIGNAL BALANCE

[75] Inventors: Kenichi Suda, Yokohama; Shizuo Hasegawa, Tokyo; Nobuo Matsuoka, Yokohama, all of Japan

[73] Assignee: Canon Kabushiki Kaisha, Tokyo, Japan

[21] Appl. No.: 119,842

[22] Filed: Nov. 12, 1987

[30] Foreign Application Priority Data

Nov. 14, 1986 [JP] Japan ................................ 61-269842
Nov. 14, 1986 [JP] Japan ................................ 61-269843

[51] Int. Cl.⁴ ........................ H04N 1/10; H04N 1/024
[52] U.S. Cl. .................................... 358/494; 358/75; 358/213.16
[58] Field of Search ................. 358/293, 294, 163, 75, 358/29, 29 C, 213.16

[56] References Cited

U.S. PATENT DOCUMENTS

| | | | |
|---|---|---|---|
| 4,216,503 | 8/1980 | Wiggins | 358/294 X |
| 4,274,111 | 6/1981 | Murase | 358/75 |
| 4,285,004 | 8/1981 | Morrison et al. | 358/163 X |
| 4,356,513 | 10/1982 | Yoshimura et al. | 358/293 X |
| 4,525,741 | 6/1985 | Chahal et al. | 358/213.16 X |
| 4,589,034 | 6/1986 | Yokomizo | 358/234 |
| 4,644,391 | 2/1987 | Shibuya et al. | 358/293 X |
| 4,691,114 | 9/1987 | Hasegawa et al. | 358/293 X |
| 4,729,035 | 3/1988 | Tanioka | 358/294 X |
| 4,734,787 | 3/1988 | Hayashi | 358/293 |

FOREIGN PATENT DOCUMENTS

| | | | |
|---|---|---|---|
| 377862 | 9/1984 | Austria . | |
| 169411 | 1/1986 | European Pat. Off. . | |
| 233990 | 9/1987 | European Pat. Off. . | |
| 2915398 | 10/1980 | Fed. Rep. of Germany . | |
| 3014629 | 10/1980 | Fed. Rep. of Germany . | |
| 53-108228 | 9/1978 | Japan | 358/163 |
| 54-107213 | 8/1979 | Japan | 358/163 |
| 56-102168 | 8/1981 | Japan | 358/213.16 |
| 56-111374 | 9/1981 | Japan | 358/163 |
| 58-056570 | 4/1983 | Japan | 358/75 |
| 59-086361 | 5/1984 | Japan | 358/75 |
| 59-086362 | 5/1984 | Japan | 358/75 |
| 2156628 | 10/1985 | United Kingdom . | |

*Primary Examiner*—Howard W. Britton
*Assistant Examiner*—E. Anne Faris
*Attorney, Agent, or Firm*—Fitzpatrick, Cella, Harper & Scinto

[57] ABSTRACT

An image reading apparatus includes a plurality of linear sensors of reading an image of a document. Each linear sensor reads a different portion of a line of the document in a divided manner. A plurality of clamp circuits control black levels of signals generated by the plurality of linear sensors to be a black reference level. A plurality of multipliers control white levels of signals generated by the plurality of linear sensor means which are level-controlled by the clamp circuits so as to be a white reference level.

11 Claims, 8 Drawing Sheets

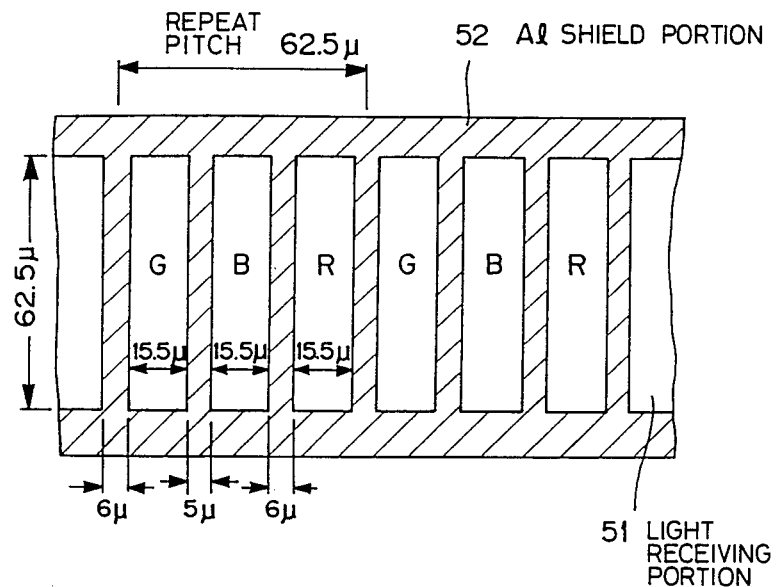
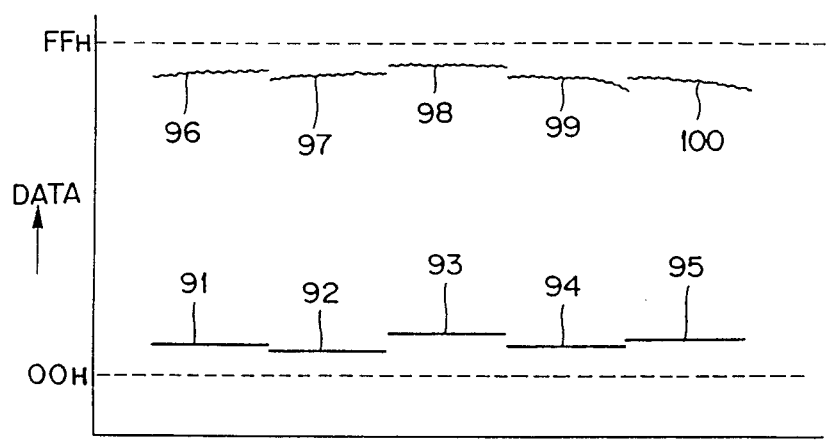

IMAGE READING APPARATUS WHICH ADJUSTS IMAGE SIGNALS TO IMPROVE SIGNAL BALANCE

BACKGROUND OF THE INVENTION

1. Field of the Invention

The present invention relates to an image reading apparatus for photoelectrically reading an image using an image sensor.

2. Related Background Art

A demand has arisen for developing a high-resolution, compact, color image reading apparatus which reads image data from a document carrying the image data. As a technique for meeting such a demand, as proposed in U.S. patent application Ser. Nos. 061,047 (filed on June 12, 1987), 724,300 (filed on April 7, 1985), and 544,240 (filed on Oct. 21, 1983) by the present applicant, a solid-state scan technique is known. More specifically, an apparatus using a combination of a photodiode array and a MOS switch, or using a semiconductor function element having both a pixel separation function and an optical data storage function, is known. Such a solid-state imaging element is highly miniaturized. Therefore, the size of one chip is much smaller than that of a document. For this reason, a reduction optical system must be used between a document surface and the element.

On the other hand, when an optical system is used which has a one-to-one focusing correspondence, such as a focusing optical transmission array in which a large number of focusing optical fibers are aligned in arrays, an apparatus does not become large in size unlike the case wherein the reduction optical system is used. However, in consideration of color balance or assurance of gray scale levels, a linear light receiving element array must be used over the total width of a document.

For this reason, in recent years, studies on development of a contact sensor have been made. The present applicant proposed an image reading apparatus using the contact sensor in U.S. patent application Ser. Nos. 023,968 (filed on May 10, 1987), 704,920 (filed on Feb. 25, 1985), and 804,110 (filed on Dec. 3, 1985). In an arrangement using the contact sensor, since the reduction optical system need not be used, the apparatus can be rendered compact. However, it is difficult to prepare an elongate sensor capable of covering the total width of a document. Therefore, a plurality of line sensors are arranged in a line or in a staggered manner.

Therefore, signals separately read by a plurality of lines of line sensors must be linked to obtain a continuous signal for a line. In this case, if the characteristics of the line sensors or the characteristics of processing circuits corresponding to the line sensors are not uniform, a good image output cannot be obtained.

SUMMARY OF THE INVENTION

The present invention has been made in consideration of the above situation and has as its object to provide an image reading apparatus capable of obtaining a good image signal output when a document image is read by a plurality of line sensors.

It is another object of the present invention to provide an image reading apparatus capable of obtaining an image signal having a high black level in an arrangement wherein a document image is read by a plurality of line sensors.

It is still another object of the present invention to provide an image reading apparatus suitable for reading a color document.

It is still another object of the present invention to provide an image reading apparatus capable of outputting a good image signal with respect to both black and white images.

The above and other objects and effects of the present invention will be apparent from the following description.

BRIEF DESCRIPTION OF THE DRAWINGS

FIG. 5 is a view for explaining a pixel arrangement in a CCD chip;

FIG. 9 is a view for explaining black and white correction operations in this embodiment;

DETAILED DESCRIPTION OF THE PREFERRED EMBODIMENT

An embodiment of the present invention will be described with reference to the accompanying drawings.

Figure 12:
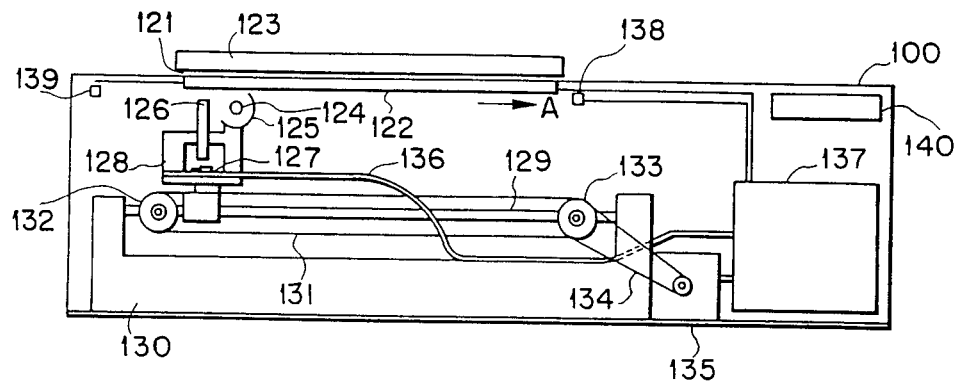
FIG. 12 is a view showing an arrangement of an image reading apparatus.

FIG. 12 shows an arrangement of an image reading apparatus 100 to which the present invention is applied.

In FIG. 12, the apparatus 100 includes a transparent document glass table 122 for placing a document 121 thereon, a document cover 123, a light source 124 for exposing the document 121, a reflection shade 125 for efficiently providing an amount of light of the light source 124, a focusing optical transmission array 126 for guiding light reflected by the document 121, and a sensor unit 127 for converting an optical image focused by the array 126 into an electrical signal. In addition, the apparatus 100 includes a reciprocal sensor fixing table 128 for fixing the light source 124, the reflection shade 125, the array 126, and the sensor unit 127, a shaft 129 for holding the sensor fixing table 128, a fixing table 130 for supporting the shaft 129, a wire 131 for transmitting a reciprocating force to the sensor fixing table 128, a roller 132 for transmitting a drive force of the wire 131, a drive roller 133, fixed to a rotational drive source, for fixing the wire 131, a drive wire 134 connecting a drive source and the drive roller 133, a motor 135 as a drive source, and a cable 136 for guiding an output from the sensor unit 127.

The apparatus 100 further includes a control processing unit 137 for controlling the output from the sensor unit 127, and the operation of the light source 124 and the motor 135. Moreover, the apparatus 100 includes a forward limit switch 138 operated by the sensor fixing table 128, a home position sensor 139 for the sensor fixing table 128, and an operation panel 140 which is used by an operator to input a copy instruction and the like.

Operation of the image reading apparatus will now be described. When a copy instruction is input from the operation panel 140, the control processing unit 137 outputs a signal for turning on the light source 124. The light source 124 is turned on in response to this signal. Then, the motor 135 is rotated in a normal direction. The sensor fixing table 128 begins to move forward in a direction indicated by an arrow A. Thus, the document 121 is read for each line by the sensor unit 127 which is moved in a sub-scan direction. Then, the optical line image read by the sensor unit 127 is converted into an electrical signal. The fixing table 128 which has reached an end point of reciprocal movement operates the forward limit switch 138, thereby causing the motor 135 to rotate in a reverse direction. Thus, the fixing table 128 begins to move backward. Then, the home position sensor 139 is operated to stop the motor 135, and the sensor fixing table 128 is stopped at the home position.

Figure 1:
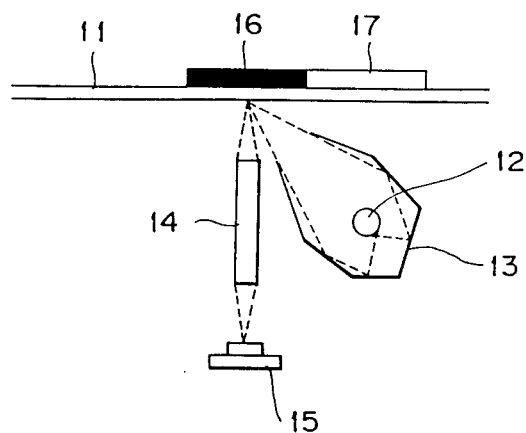
FIG. 1 is a side view showing an arrangement of an optical system and a sensor unit used in an embodiment of the present invention.

FIG. 1 shows n arrangement of an optical system used in the image reading apparatus of this embodiment. In FIG. 1, the optical system includes a halogen lamp 12 serving as the light source, a reflection shade 13 for focusing a light beam onto a document glass 11, a focusing optical transmission array 14 which is arranged at a position receiving light focused on a document surface and reflected thereby, and at which the document surface is located at a focal point on an incident side, and a sensor unit 15 having CCDs. The sensor unit 15 is arranged at a focal point opposite to that of the array 14, so that an erect image having one-to-one correspondence with a document image is focused on a CCD chip of the sensor unit 15. Black and white plates 16 and 17 serving as references in black and white correction operations (to be described later) are arranged outside, e.g., a placing range of a document.

Figure 2:
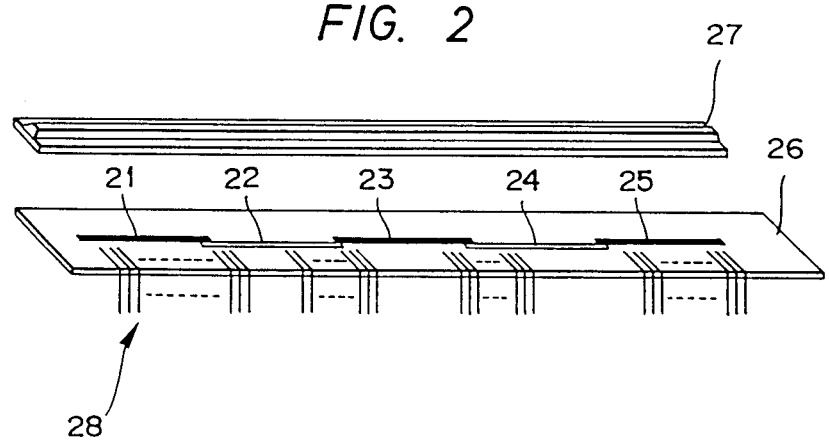
FIG. 2 is a perspective view showing a mechanical arrangement of the sensor unit.

FIG. 2 shows an arrangement of the sensor unit 15. The sensor unit 15 used in this embodiment has a ceramic circuit board 26 on which five CCD chips 21 to 25 are arranged in a staggered manner, a glass cover 27 for covering the ceramic circuit board 26, and connecting lead wires 28.

Figure 3:
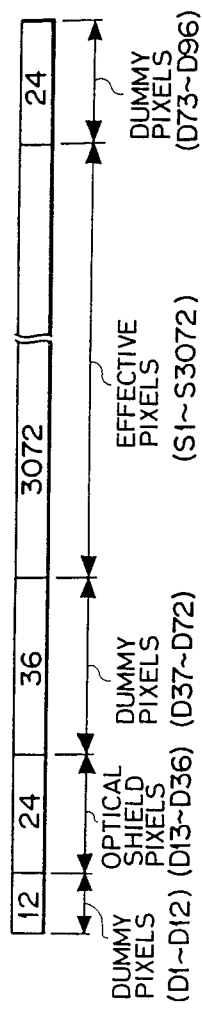
FIG. 3 is a view for explaining a pixel arrangement of the sensor unit.
Figure 4:
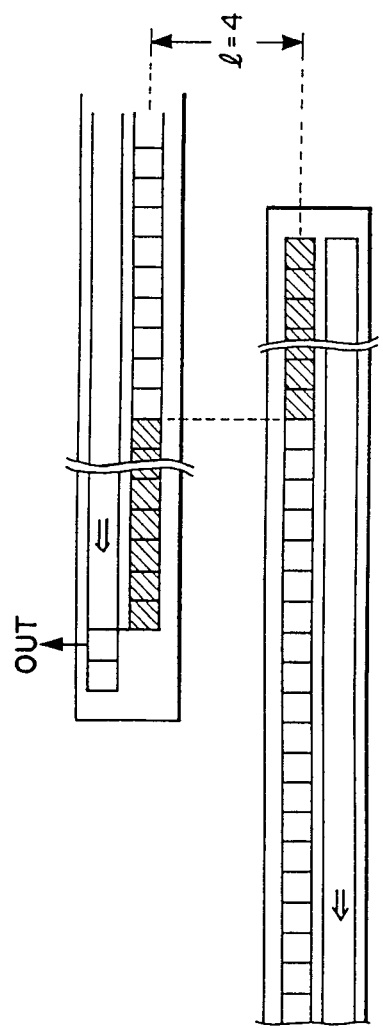
FIG. 4 is a view for explaining a CCD chip arrangement in the sensor unit used in this embodiment.

FIG. 3 shows an arrangement of pixels of the CCD chip in the sensor unit 15. The CCD chip comprises a line sensor in which a light receiving portion having a total of 3168 pixels, i.e., dummy pixels D1 to D12, optical shield pixels D13 to D36 shielded by aluminum (Al) or the like, dummy pixels D37 to D72, effective signal pixels S1 to S3072, and rear-end dummy pixels D73 to D96 are aligned in an array. In this embodiment, as described above, the CCD chips 21 to 25 are aligned in two arrays in a staggered manner. The two arrays of the CCD chips are arranged parallel to each other to have a central distance l of the light receiving portions. Upon arrangement, the CCD chips overlap so that the effective signal pixels S1 to S3072 of the adjacent chips are continued to define a total effective read width of 304 mm by the CCD chips 21 to 25.

In this embodiment, the distance l corresponds to four pixels. Therefore, images to be focused on the adjacent CCD chips are separated by four lines with respect to a document surface. In order to adjust this, memories are provided to the CCD chips 21 to 25. FIG. 5 shows the arrangement of the CCD chips 21 to 25. In FIG. 5, each CCD chip includes light receiving portions 51 as photosensitive pixels, and an Al shield portion 52. Each light receiving portion 51 comprises a silicon (Si) photodiode, and has a size of 62.5 $\mu$m × 15.5 $\mu$m, as shown in FIG. 5.

A color filter is directly deposited on each Si element. Green (G), blue (B), and red (R) color filters are repetitively arranged and one pixel in a read mode is constituted by 3 bits.

Figure 6:
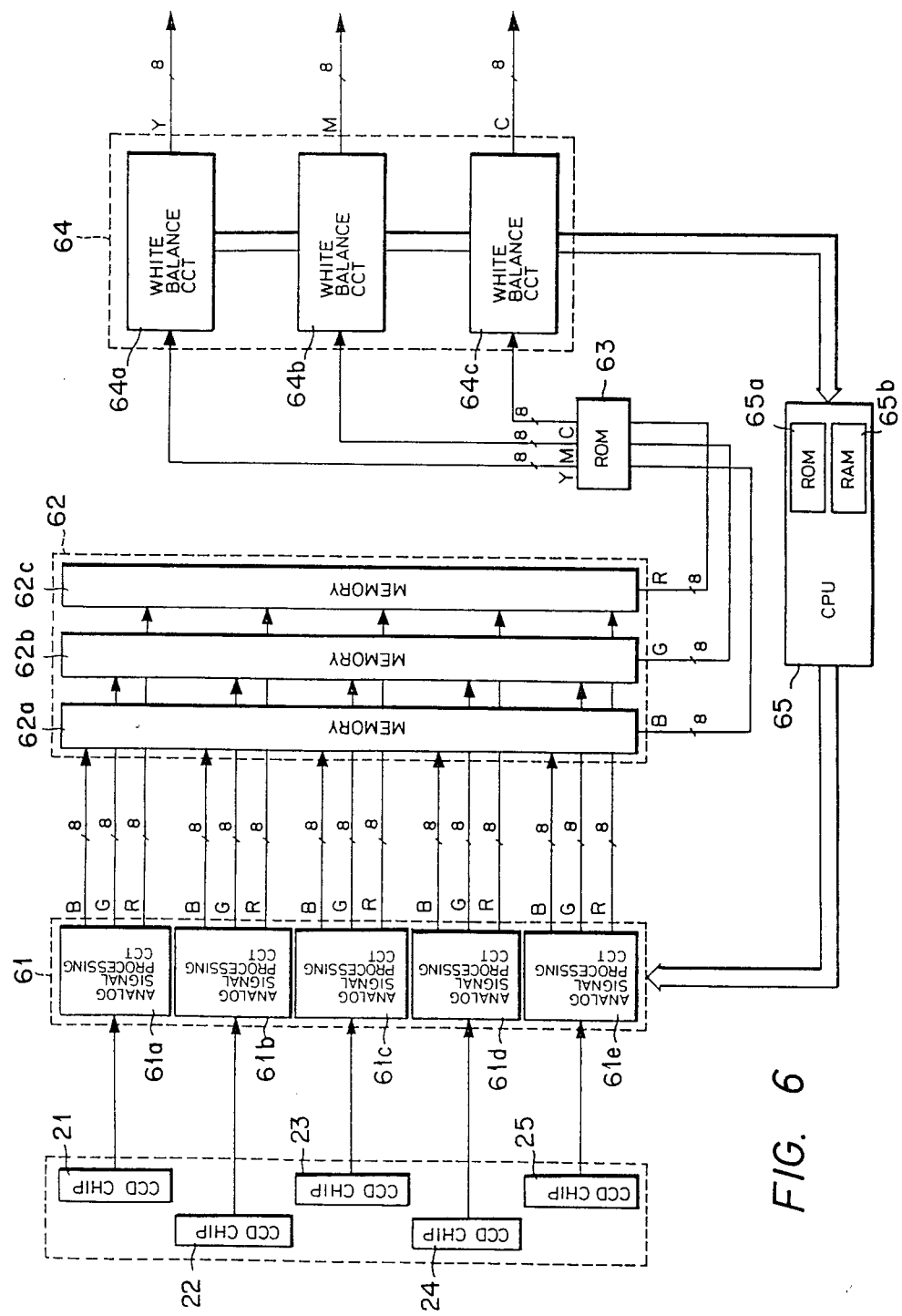
FIG. 6 is a block diagram showing an arrangement of a signal processing unit in the embodiment of the present invention.

FIG. 6 shows an arrangement of a signal processing unit in the image reading apparatus according to this embodiment. B, G, and R pixel outputs from each of the CCD chips 21 to 25 are output as a composite signal. The composite signal from each CCD chip is first input to an analog signal processing circuit unit 61 to be separated into B, G, and R signals. The respective color signals are subjected to gain and level control, and are then A/D converted into 8-bit digital signals. The analog signal processing circuit unit 61 comprises analog signal processing circuits 61a to 61e receiving image signals from the CCD chips 21 to 25, respectively. Each circuit has an independent circuit arrangement.

A memory unit 62 is adapted to link image signals in the effective image width of 304 mm for each color of the digital image signal so that the pixels of the effective image width are not disconnected and do not overlap each other. The memory unit 62 includes memories 62a, 62b, and 62c for respectively storing B, G, and R image signals.

The image signals which are linked in line for each color by the memory unit 62 are subjected to logarithmic conversion by a table developed in a ROM 63 to be converted into yellow (Y), magenta (M), and cyan (C) color density signals from the B, G, and R optical signals. The converted data are input to a white balance circuit unit 64. Thus, variations in sensitivity and amount of light of pixels of the CCD chips 21 to 25 are corrected by the circuit unit 64. The circuit unit 64 includes white balance circuits 64a, 64b, and 64c for independently correcting the Y, M, and C signals. Image signals are supplied from the white balance circuits 64a to 64c to a CPU 65, so that correction data subjected to black and white correction operations are fed back from the CPU 65 to the analog signal processing circuit unit 61, as will be described later with reference to FIG. 10. The CPU 65 includes a ROM 65 storing a program corresponding to the processing sequence shown in FIG. 10, and a RAM 65b having work areas.

Figure 7:
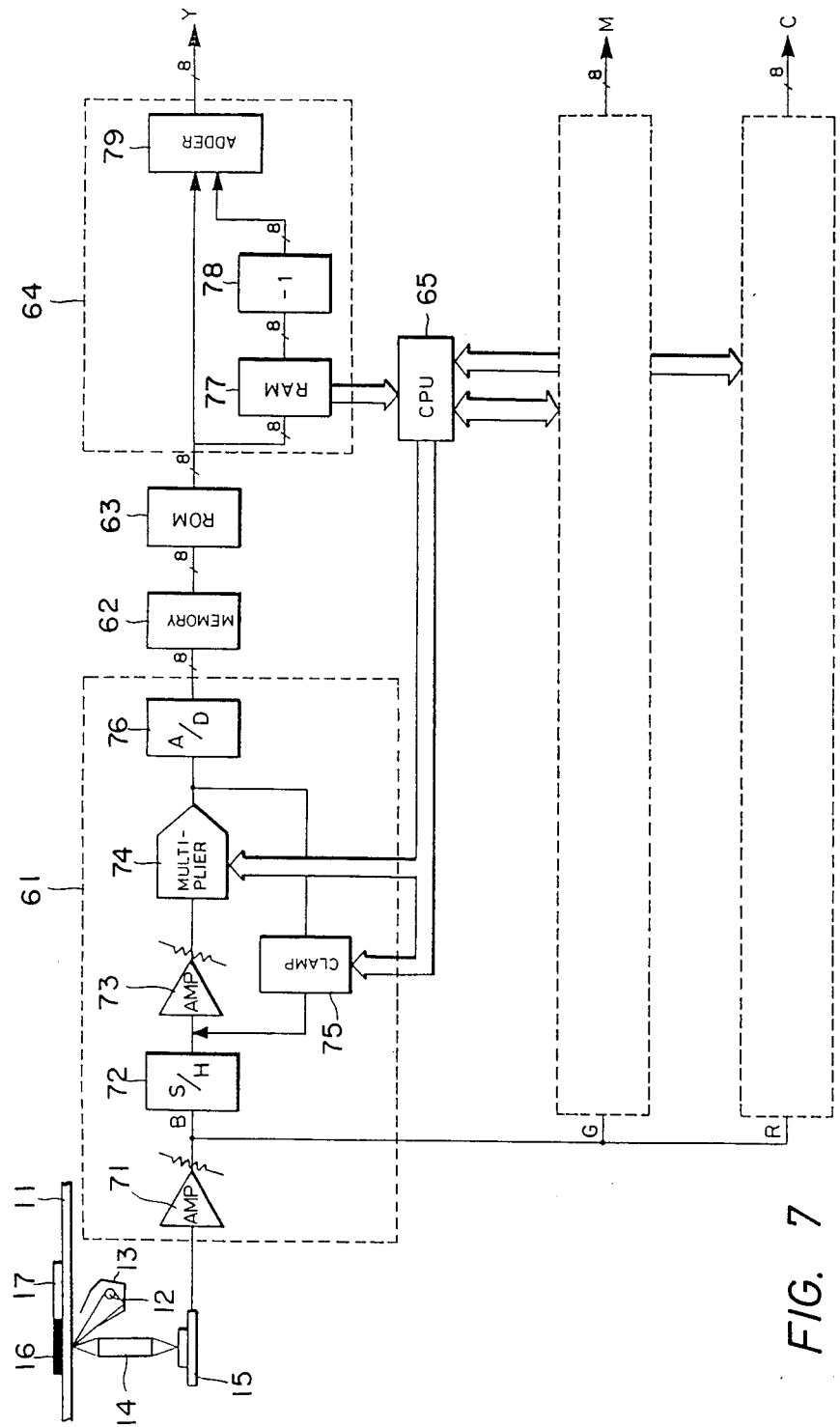
FIG. 7 is a block diagram showing a detailed arrangement of the signal processing unit shown in FIG. 6.

FIG. 7 shows a detailed arrangement of the signal processing unit shown in FIG. 6. A signal processing operation of one CCD chip will be described with reference to FIG. 7. Note that FIG. 7 illustrates a circuit arrangement for a color signal B. Similar circuit arrangements can be adopted for color signals G and R.

The composite image signal output from the sensor unit 15 is amplified by a variable amplifier 71, and is then separated into each of B, G, and R image signals by a sample/hold circuit 72.

The separated signal is amplified by a variable amplifier 73, and is input to an 8-bit A/D converter 76 through a multiplier 74. The multiplier 74 will be described later in detail. During signal level control, the multiplier 74 serves as an amplifier having a fixed gain. An upper level of the input level to the A/D converter 76 is adjusted by the variable amplifiers 71 and 73 using an image signal obtained when the sensor unit 15 reads the reference white plate 17. The input signal to the A/D converter 76 is fed back to the input terminal of the variable amplifier 73 through a clamp circuit 75 which clamps data using an output corresponding to the optical shield pixels described with reference to FIG. 3. A bias level is added to the clamp level, so that the lower level of the input to the A/D converter 76 is adjusted using an image signal obtained when the sensor unit 15 reads the reference black plate 16.

8-bit digital image signals from the A/D converter 76 are linked by the memory 62 of the corresponding color, so that the signals from the five CCD chips 21 to 25 are linked in line, as has been described with reference to FIG. 6. Thus, independent image signals are reconstructed as one image signal.

In this manner, the image signal reconstructed by the memory 62 is subjected to logarithmic conversion by the ROM 63, and is converted to a signal representing a color density.

The image signal is corrected by the white balance circuit 64 including a RAM 77, an inverter 78, and an adder 79 based on a signal when the sensor unit 15 reads the reference white plate 17 as described above.

The above operation is performed for three colors, i.e., B, G, and R, and for the CCD chips 21 to 25. Note that the CPU 65 time-serially controls the respective signal processing units.

As described above, the analog signal processing circuit unit 61 according to this embodiment has independent circuit arrangements for the five CCD chips 21 to 25. Therefore, it is difficult to strictly perform level control among the CCD chips in the image signal reconstructed in line. Due to independent circuit systems, if different drifts occur in circuits, a means for correcting them is necessary. For this reason, in this embodiment, black and white correction operations are performed.

The black correction is performed by the clamp circuit 75 shown in FIG. 7.

Figure 8:
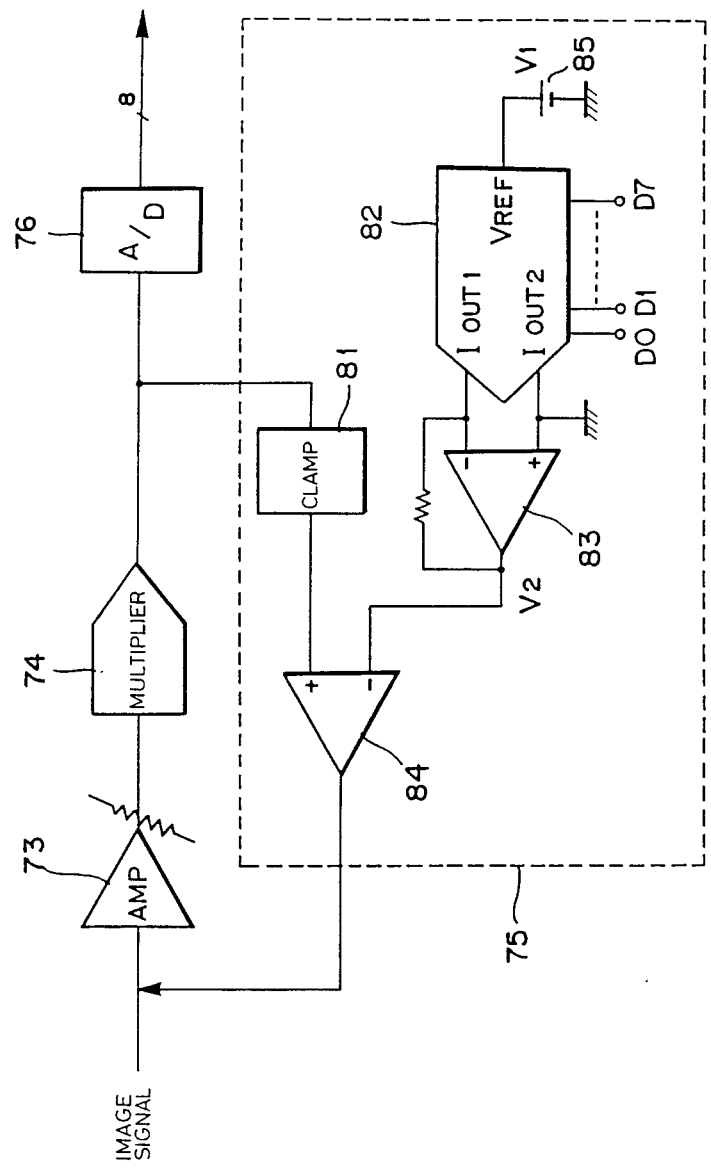
FIG. 8 is a circuit diagram showing a detailed arrangement of a clamp circuit for performing black correction in the processing unit shown in FIG. 7.

FIG. 8 shows a detailed arrangement of the clamp circuit 75. The clamp circuit 75 according to this embodiment comprises a clamp circuit 81 for clamping an optical shield pixel output of the CCD chip at 0 V, a multiplier type D/A converter 82 receiving a voltage $V_1$ output from a constant voltage power supply 85 and capable of controlling an output by 8-bit digital data, a current-voltage conversion amplifier 83, and an operational amplifier 84.

Therefore, an output from the amplifier 83 is determined by 8-bit digital input values D0 to D7 of the D/A converter 82, and the relationship between the input voltage $V_1$ and an output voltage $V_2$ is as follows:

$$V_2 = V_1 \times D/255$$

(D digital input value)

Therefore, a bias level added to the clamp level of a signal from the operational amplifier 84 can be controlled by the 8-bit digital data D0 to D7 from the CPU 65.

When the black correction is performed, the digital values input to the D/A converter 82 are set to be a given constant, and an image signal obtained when the sensor unit 15 reads the reference black plate 16 is fetched from the RAM 77 to the CPU 65.

FIG. 9 shows a level of the one-line image signal obtained in this manner. In FIG. 9, image signals 91 to 95 are obtained when the CCD chips 21 to 25 read the black plate 16.

Since the CCD chips 21 to 25 have different sensitivities, the levels of the signals therefrom vary, as shown in FIG. 9. In order to correct the variation and improve gray scale levels, each level obtained when the black plate 16 is read is calculated by the CPU 65 to be the mimimum level of the output from the A/D converter 76, i.e., 00H, and the corresponding correction value is fed back to each D/A converter 82 using the data D0 to D7 with respect to the processing circuits of the CCD chips 21 to 25.

Figure 10:
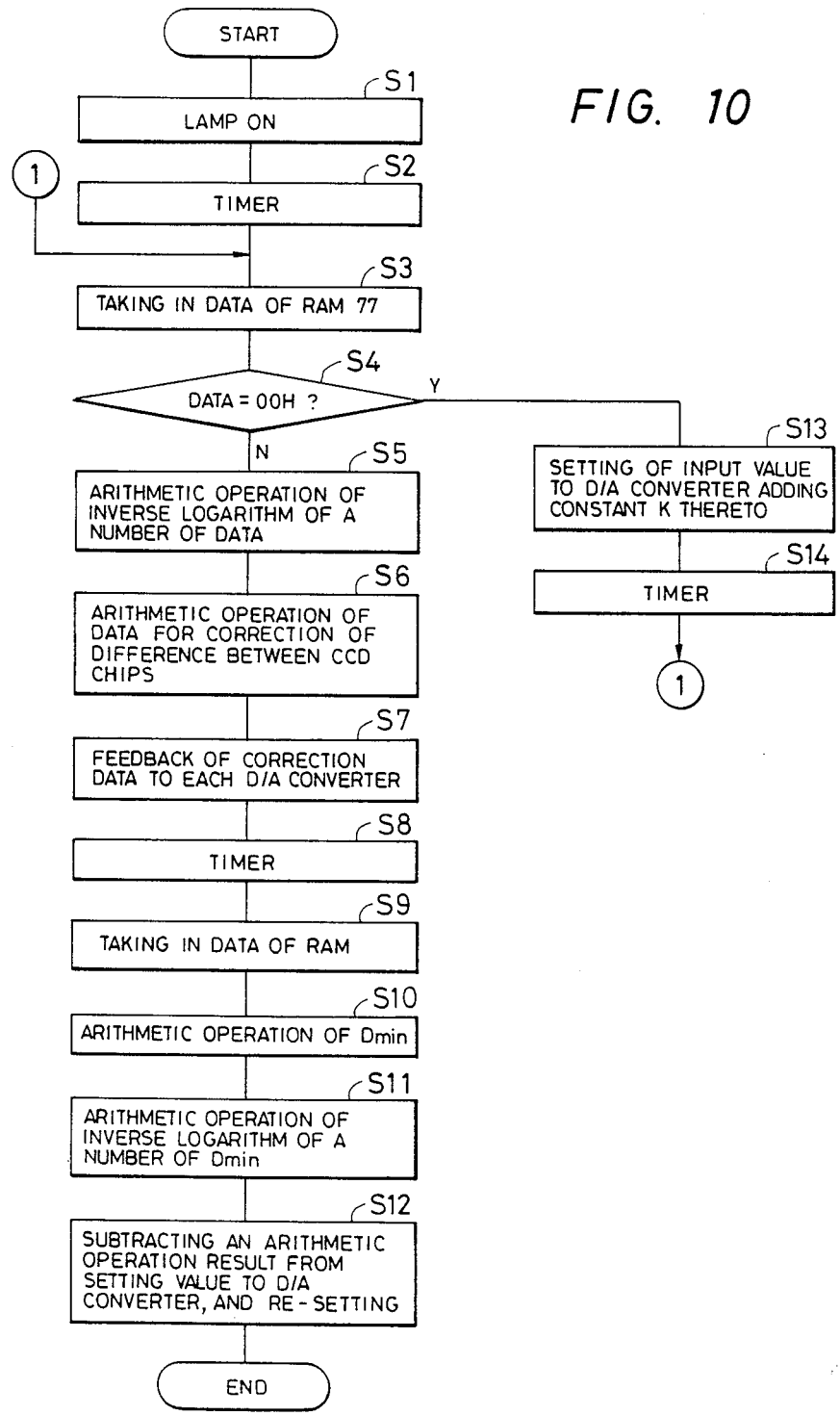
FIG. 10 is a flow chart showing a processing sequence of black correction in this embodiment.

FIG. 10 shows the processing sequence executed by the CPU 65 during the black correction.

At the beginning of the processing, in an apparatus in which an optical system is moved with respect to a document, the optical system is located below the black plate 16. In step S1, the lamp 12 is turned on, and in step S2, the apparatus stands by using a timer until an amount of light of the lamp 12 is stabilized.

In step S3, data developed in the RAM 77 and obtained by reading the black plate 16 by the CCD chips 21 to 25 are fetched in the CPU 65. It is checked in step S4 if "00H" is present in one-line data. If N (NO) in step S4, the flow advances to step S5, and inverse logarithms of the data are calculated to recover data before logarithmic conversion by the ROM 63. In step S6, a correction value for aligning boundary data of the adjacent CCD chips is calculated. In step S7, the correction value is added to data set to be digital input values to the D/A converter 82 corresponding to each CCD chip, thus resetting the data.

After a predetermined period of time concerning an operation time of the circuits has been counted by a timer in step S8, the data in the RAM 77 are again fetched in the CPU 65.

In order to reduce the entire level to "00H" while the image signals are linked in one line, a minimum value Dmin of data in one line is calculated in step S10. In step S12, the value Dmin is subtracted from the digital input values to the D/A converter 82, thus resetting the data.

Meanwhile, if it is determined in step S4 that "00H" is present in the one-line data, this means that the input values D0 to D7 initially set in the D/A converter 82 are too small. Therefore, in step S13, a constant K is added to the input values, and are again input to the D/A converter 82. After a predetermined period of time has passed in consideration of the operation time of the circuit in step S14, the flow returns to step S3, and the same operation in step S3 and subsequent steps is performed.

The above operation is performed for three colors, i.e., B, G, and R. Thus, the image signals obtained when the black plate 16 is read are linked in one line, and the one-line image signal can be approximated to minimum value "00H" of the image data.

The white correction is performed by the multiplier 74 shown in FIG. 7.

Figure 11:
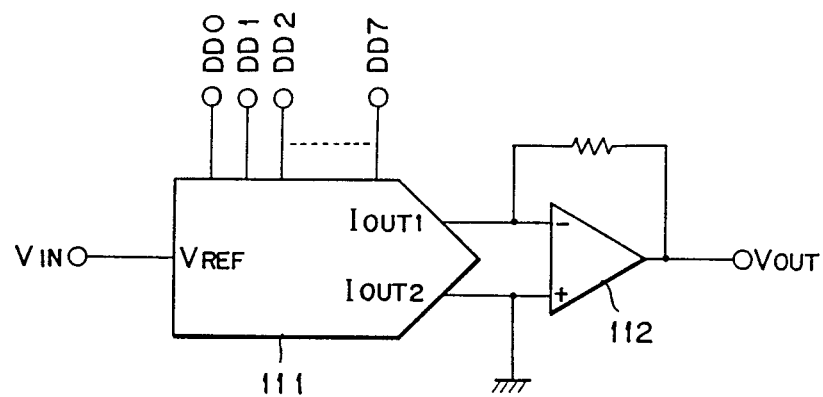
FIG. 11 is a circuit diagram showing a detailed arrangement of a multiplier for performing white correction in the processing unit shown in FIG. 7.

FIG. 11 shows a detailed arrangement of the multiplier 74. In FIG. 11 the multiplier 74 includes a multiplier type D/A converter 111 having 8-bit digital input terminals DD0 to DD7, and a current-voltage conversion amplifier 112.

First, digital values into the D/A converter 111 are set to be a given constant. Note that the image signal level when the sensor unit 15 reads the white plate 17, i.e., the input level to the A/D converter 76, is preadjusted by the variable amplifiers 71 and 73 so as not to exceed the maximum input level of the A/D converter and so as to be approximated thereto.

At this time, a one-line image signal is fetched from the RAM 77 in the CPU 65. Referring again to FIG. 9, image signals 96 to 100 are output form the CCD chips 21 to 25 when they read the white plate 17. Since the sensitivities of the CCD chip are different from each other or the circuit systems are independently arranged, the respective signals are not linearly linked. In order to correct this and to improve the gray scale levels of the apparatus, an image signal obtained when the sensor 15 read the white plate 17 is calculated by the CPU 65 to be approximated to the maximum value of the output from the A/D converter, i.e., "FFH", and independent correction values DD0 to DD7 are fed back to each D/A converter 111 with respect to the processing circuits of the CCD chips 21 to 25.

The white correction described above can be executed following the same procedures as in FIG. 10 for the black correction.

When the white correction described above is performed, even if an amount of light varies, the image signal obtained when the white plate 17 is read is fed back to be approximated to "FFH". Therefore, gradation of the image data will not be impaired.

In the above embodiment, in the sensor unit, the sensors are arranged in a staggered manner. However, the arrangement of the sensors may be changed. For example, the sensors can be linearly arranged.

According to the above embodiment as described above, the clamp level of the image signals from each sensor is individually corrected in accordance with the level of an image signal obtained when a black reference image such as a black plate is read. Therefore, the image signals can be linearly linked at a level when the black reference image is read, i.e., when the original density is high, thus obtaining a stable image signal.

The image signal at this time is caused to coincide with the lower input level of the A/D converter. Therefore, a wide range of gray scale levels can be reproduced.

A gain of an image signal of each sensor is individually corrected in accordance with an image signal level obtained when a white reference image, e.g., a white plate, is read. Thus, the image signals obtained when a white reference image is read can be linearly linked. If different drifts occur in independent processing circuits, they can be corrected.

Furthermore, the linearly linked image signals are always corrected to be an identical level. Even if an amount of light varies, identical gray scale levels can always be obtained without impairing gradation.

The present invention has been described with reference to the preferred embodiment. However, the present invention is not limited to this and various changes and modifications may be made within the spirit and scope of the appended claims.

What is claimed is:

1. An image reading apparatus comprising:
   a plurality of linear sensor means for reading an image of a document, each of said linear sensor means reading a different portion of a line of the document in a divided manner;
   a plurality of level shift means each for shifting a level of a signal generated by a respective one of said plurality of linear sensor means; and
   control means for controlling said plurality of level shift means on the basis of a plurality of black reference signals generated by said plurality of linear sensor means, so as to align levels of those black reference signals that correspond to a boundary of adjacent linear sensor means.

2. An apparatus according to claim 1, wherein said plurality of linear sensor means generate said plurality of black reference signals by reading a black reference member.

3. An apparatus according to claim 1, further comprising converting means for converting signals from said plurality of level shift means into digital signals.

4. An apparatus according to claim 1, wherein each of said plurality of linear sensor means reads a color image of a document and generates a plurality of color component signals.

5. An apparatus according to claim 1, wherein said control means has storing means for storing the plurality of black reference signals.

6. An apparatus according to claim 1, further comprising means for linking the signals level-shifted by said plurality of level shift means.

7. An image reading apparatus comprising:
   a plurality of linear sensor means for reading an image of a document, each of said linear sensor means reading a different portion of a line of the document in a divided manner;
   a plurality of black level control means each for controlling a black level of a signal generated by respective ones of said plurality of linear sensor means to align black levels of those signals that correspond to a boundary of adjacent linear sensor means; and
   a plurality of white control means each for controlling a white level of a signal which is level-controlled by a respective one of said plurality of black level control means, so as to be white reference level.

8. An apparatus according to claim 7, wherein said plurality of black level control means perform a control operation on the basis of signals obtained by reading a black reference member using said plurality of linear sensor means.

9. An apparatus according to claim 7, wherein said plurality of white level control means perform a control operation on the basis of signals obtained by reading a white reference member using said plurality of linear sensor means.

10. An apparatus according to claim 7, wherein each of said plurality of linear sensor means reads a color image of a document and generates a plurality of color component signals.

11. An apparatus according to claim 7, further comprising means for linking the signals level-controlled by said plurality of white control means.

* * * * *

UNITED STATES PATENT AND TRADEMARK OFFICE
CERTIFICATE OF CORRECTION

PATENT NO. : 4,862,286

DATED : August 29, 1989

INVENTOR(S) : KENICHI SUDA, ET AL.

It is certified that error appears in the above-identified patent and that said Letters Patent is hereby corrected as shown below:

IN [57] ABSTRACT

Line 2, "of reading" should read --for reading--.

COLUMN 3

Line 26, "n" should read --an--.

COLUMN 5

Line 57, "(D digital input value)" should read --(D: digital input value)--.

COLUMN 7

Line 5, "form" should read --from--.

UNITED STATES PATENT AND TRADEMARK OFFICE
CERTIFICATE OF CORRECTION

PATENT NO. : 4,862,286

DATED : August 29, 1989

INVENTOR(S) : KENICHI SUDA, ET AL.

It is certified that error appears in the above-identified patent and that said Letters Patent is hereby corrected as shown below:

COLUMN 8

Line 40, "white control means" should read --white level control means--.

Line 43, "white reference" should read --a white reference--.

Signed and Sealed this

Eleventh Day of December, 1990

Attest:

HARRY F. MANBECK, JR.

Attesting Officer

Commissioner of Patents and Trademarks